US010695908B2

(12) United States Patent
Dietrich

(10) Patent No.: US 10,695,908 B2
(45) Date of Patent: Jun. 30, 2020

(54) ACCESS PROTECTION SYSTEM

(71) Applicant: SICK AG, Waldkirch (DE)

(72) Inventor: Urs Dietrich, Kenzingen (DE)

(73) Assignee: SICK AG, Waldkirch/Breisgau (DE)

( * ) Notice: Subject to any disclaimer, the term of this patent is extended or adjusted under 35 U.S.C. 154(b) by 223 days.

(21) Appl. No.: 15/852,839

(22) Filed: Dec. 22, 2017

(65) Prior Publication Data

US 2018/0178385 A1 Jun. 28, 2018

(30) Foreign Application Priority Data

Dec. 23, 2016 (DE) .................... 10 2016 125 595

(51) Int. Cl.
*G01V 8/10* (2006.01)
*B25J 9/16* (2006.01)
*F16P 3/14* (2006.01)
*G01V 8/26* (2006.01)

(52) U.S. Cl.
CPC ............. *B25J 9/1676* (2013.01); *F16P 3/144* (2013.01); *G01V 8/26* (2013.01); *Y10S 901/47* (2013.01); *Y10S 901/49* (2013.01)

(58) Field of Classification Search
CPC ......... B25J 9/1974; B25J 9/1976; G01V 8/10; G01V 8/26
USPC ............................................... 250/221, 222.1
See application file for complete search history.

(56) References Cited

U.S. PATENT DOCUMENTS

| 6,979,814 | B2 * | 12/2005 | Kudo | ..................... F16P 3/144 |
| | | | | 250/221 |
| 8,339,260 | B2 * | 12/2012 | Krieger | ................... B65H 26/00 |
| | | | | 250/216 |
| 2011/0090040 | A1 | 4/2011 | Allen et al. | |

FOREIGN PATENT DOCUMENTS

| DE | 102004043515 A1 | 3/2006 |
| DE | 102006012823 A1 | 9/2007 |
| DE | 202009006683 U1 | 9/2010 |
| EP | 2249075 A1 | 11/2010 |
| EP | 2315052 A1 | 4/2011 |

OTHER PUBLICATIONS

German office action dated Aug. 11, 2017 for corresponding application No. S13184PDE.
"User Manual Safezone Multizone Safety Laser Scanner", 2005.
(Continued)

*Primary Examiner* — Kevin K Pyo
(74) *Attorney, Agent, or Firm* — Nath, Goldberg & Meyer; Jerald L. Meyer

(57) ABSTRACT

An access protection system comprises a first safety sensor, a second safety sensor, and an electronic control device that is in signal connection with the first and second safety sensors. The first and second safety sensors are laser scanners that each form a safety protected field and that each form a first detection protected field in operation and that are arranged such that the first detection protected fields do not overlap at least regionally. The electronic control device is configured to trigger a safety function on a penetration of an object into the safety protected field of the first and/or second safety sensors and to change the operating state of the access protection system when a penetration of the object is determined both into the first detection protected field of the first safety sensor and into the first detection protected field of the second safety sensor.

15 Claims, 11 Drawing Sheets

(56) References Cited

OTHER PUBLICATIONS

European search report dated May 28, 2018 for corresponding application No. EP 17206011.3.
Office communication dated Aug. 1, 2018 in corresponding German Patent Application No. DE102016125595.5.

* cited by examiner

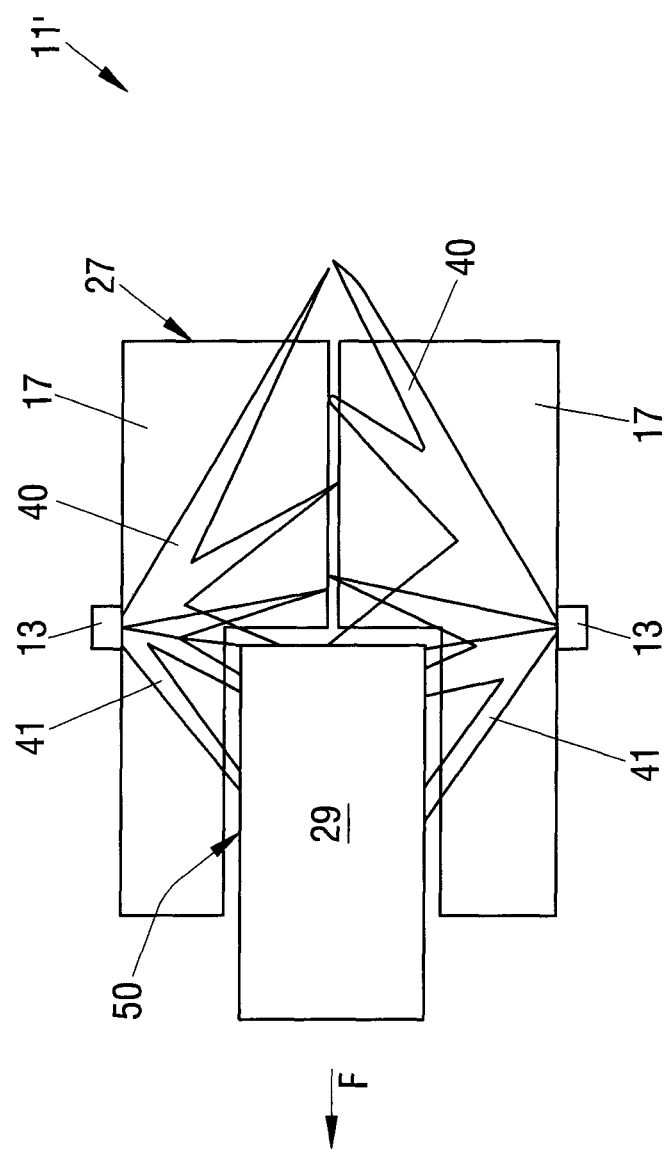

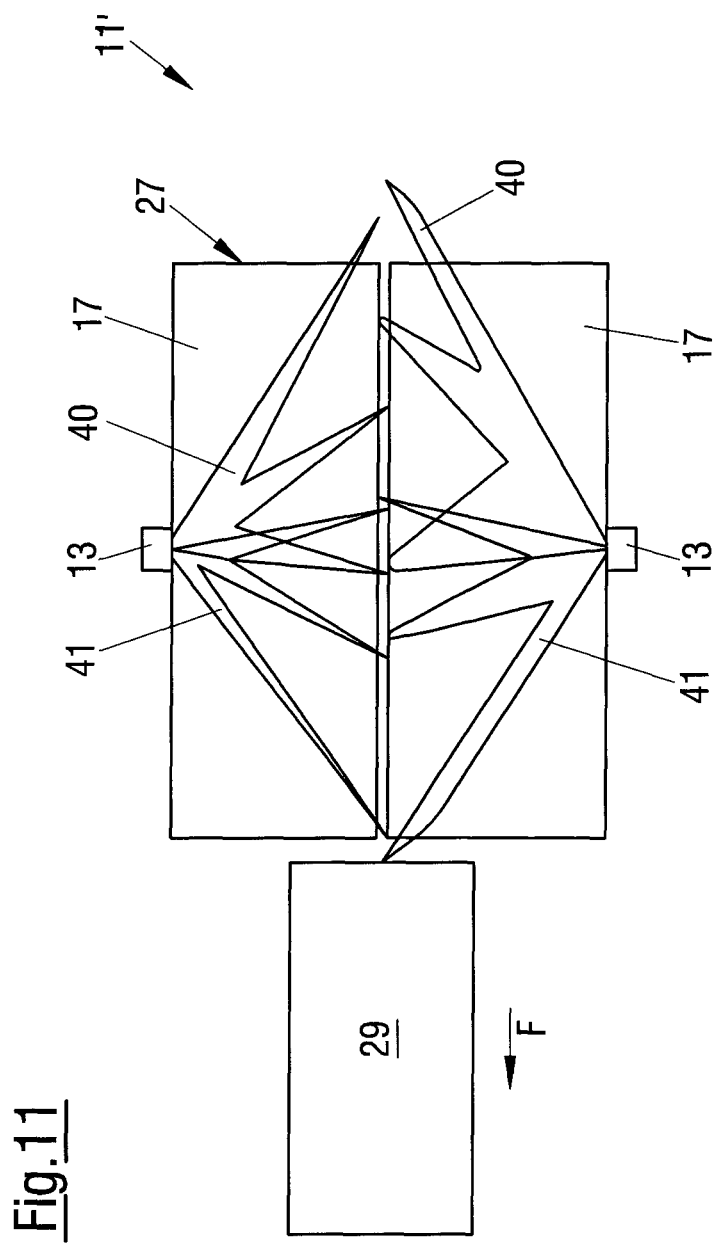

ACCESS PROTECTION SYSTEM

The present invention relates to an access protection system comprising a first safety sensor, a second safety sensor, and an electronic control device that is in signal connection with the first and second safety sensors.

Access protection systems are in particular of great importance with automated manufacturing processes and packaging processes. The robots and machines used in such automated processes represent a substantial danger potential for persons. It must therefore be ensured that no persons penetrate into the danger zone during the operation of the robots and machines. If a person nevertheless penetrates into the danger zone, corresponding protective measures have to be taken. A penetration of a person into the danger zone can be recognized by means of light grids, for example.

It is, however, problematic in this respect that it is necessary or desired in many applications that specific objects such as vehicles, components or assemblies are moved into the working zone of the robots during the operation of the plant. These objects should not trigger any alarm and should not in particular trigger any emergency switching off of the robots since this would be detrimental to the throughput of the total plant. Additional sensor arrangements such as induction loops at the floor side or reflection light barriers having code recognition can therefore be provided to recognize the approach of permitted objects and to provide a suppression of the safety measures. This is, however, associated with a high effort in manufacturing, in assembly and in control. There is in addition a high proneness to error that is particularly unacceptable in safety questions.

DE 10 2006 012 823 A1 discloses an apparatus for monitoring a danger zone that has two optical sensors spaced apart from one another. Each of the sensors comprises a camera, a lighting system, and an electronic evaluation unit. On a penetration of a person into the danger zone, the hazardous robots and machines are switched off. Non-safety critical objects are recognized and are not classified as a reason for a switching off.

It is an object of the invention to provide an access protection system that has a simple structure, that enables the penetration of permitted objects into the danger zone, and that nevertheless ensures reliable person protection in this process.

The object is satisfied by an access protection system having the features of claim 1.

The invention provides that the first and second safety sensors each form a safety protected field and each form at least one first detection protected field in operation, with the first and second safety sensors being arranged such that the first detection protected fields do not overlap at least regionally.

The first and second safety sensors are laser scanners. Laser scanners having configurable protected fields are particularly suitable for access protection.

In accordance with the invention, the electronic control device is configured
(i) to trigger a safety function on the penetration of an object into the safety protected field of the first and/or second safety sensors; and
(ii) to change the operating state of the access protection system when a penetration of the object into both the first detection protected field of the first safety sensor and into the first detection protected field of the second safety sensor is determined.

If therefore a person moves into the danger zone, the safety function is automatically triggered. The safety function can, for example, be a visual and/or acoustic warning signal, a reduction of the working speed of any robots present, or even an emergency switching off of the total associated plant. Where required, a plurality of safety functions can also be triggered in combination when an object penetrates into the safety protected field of the first and/or second safety sensors.

The two detection protected fields can be arranged and oriented such that they are infringed on an approach or penetration of a known permitted object to or into the danger zone. The operating state of the access protection system can then be changed in an application-specific manner to avoid an obstacle to operation by the permitted object. It is of particular advantage here that the change of the operating state does not necessarily have to be accompanied by a suppression of the safety function, but can rather only give rise to a restriction of the safety function—such as a speed reduction instead of an emergency switching off—or even only an adaptation of the protected zone with an otherwise complete maintenance of the safety function. Two separate pieces of entry information are available due to the two mutually independent detection protected fields to reliably recognize permitted objects and to distinguish them from persons, for example. If required, an access protection system in accordance with the invention can comprise more than two safety sensors and/or more than one safety protected field per safety sensor whose signals are evaluated in the described manner.

The electronic control device is preferably configured too subject the safety protected fields and the detection protected fields of the first and second safety sensors to a common evaluation. The evaluation of the safety protected fields and of the detection protected fields is therefore preferably carried out by one and the same unit. A particularly reliable assessment of the current plant status is thereby possible. The provision of so-called muting sensors is not required.

The electronic control device can be configured to carry out the changing of the operating state in step (ii) in dependence on the current operating state. The system can thereby relate to specific operational routines and can react flexibly to changes of state.

The electronic control device can comprise a switching logic that is configured to determine whether an object penetrating into the zone to be protected is a permitted object with reference to a logical linking of output signals of all the output protected fields and of all the detection protected fields. This enables the avoidance of false alarms, on the one hand, and of safety gaps, on the other hand, in a simple and nevertheless reliable manner. Invalid combinations of protected field infringements can in particular effect a triggering of the safety function.

In accordance with an embodiment of the invention, the changing of the operating state of the access protection system comprises an adaptation of the safety protected field of the first and/or second safety sensors. The adaptation can in particular comprise a reduction in size and/or a change of shape. The safety protected field can, for example, be withdrawn from those zones through which the permitted object should move. The safety function can then remain completely maintained in principle so that person protection is also generally ensured during the movement of the permitted object. If required, the safety function can, however, be suppressed or modified. Alternatively or additionally to an adaptation of the safety protected field, an adaptation of one or more of the detection protected fields is possible.

In accordance with a specific embodiment, the electronic control device is configured to adapt the safety protected field of the first and/or second safety sensors to the contour of a predefined permitted object in the changed operation state. This ensures a high degree of safety since the protection is not restricted any more than absolutely necessary.

The electronic control device can be configured to cause a cut-out of the total protected field formed by the safety protected field to track an object moved through it by a continuous adaptation of the safety protected field of the first and/or second safety sensors in the changed operating state. The protection can thus be maintained before and behind the object. Only that region is therefore preferably excluded from the sensor monitoring in which the permitted object is located and into which consequently no person can anyway penetrate.

In accordance with a further embodiment of the invention, the electronic control device is configured to change the operating state of the access protection system only when the penetration of the object into the first detection protected field of the first safety sensor and into the first detection protected field of the second safety sensor is determined in addition to the penetration of the object into the safety protected field of the first and/or second safety sensors, that is in particular before or simultaneously with the penetration of the object into the safety protected field of the first and/or second safety sensors.

Provision can be made that the electronic control device is configured to suppress the safety function, in particular for a predefined time period, in the changed operating state. The time required for a protected field switchover can thereby be bridged as required.

The first and second safety sensors are preferably arranged at oppositely disposed sides of a monitored zone. The monitored zone can in particular be the working zone of a robot or of a machine.

The first and second safety sensors can define directions of view that at least substantially face one another. If a permitted object is located between the two safety sensors, the space not occupied by the object can be completely monitored due to the oppositely aligned sensors.

The scan planes of the laser scanners can extend at least substantially in a coplanar manner, in parallel with one another, or slightly obliquely with respect to one another so that they span a common protection area.

It is preferred that the safety protected fields of the first and second safety sensors are adjacent to one another or overlap. A gap-less total protected field is thus defined.

Provision can be made that the first detected protected field of the first safety sensor and/or the first detection protected field of the second safety sensor each extend in at least one direction beyond the safety protected fields of the first and second safety sensors. Due to such detection protected fields, an object can already be detected before it penetrates into the safety protected fields, that is into the direct danger zone.

The first detection protected fields can be designed such that they only respond to a penetration of objects having specific features such as codes. It is then precluded that a person can cause the change of the operating state.

In accordance with a further embodiment of the invention, the first and second safety sensors each form at least one second detection protected field in operation that extends in a different direction to the first detection protected field. A particularly preferred embodiment provides three detected protected fields extending in different directions for each safety sensor. This enables a greater distinction between different objects and system states and thus increases the flexibility of the access protection system.

Further developments of the invention can also be seen in the dependent claims, in the description and in the enclosed drawings.

The invention will be described in the following by way of example with reference to the drawings.

FIGS. 7-11 are simplified plan views of an access protection system in accordance with a second embodiment of the invention during different phases of the movement of a permitted object through the protected zone.

Figure 1:
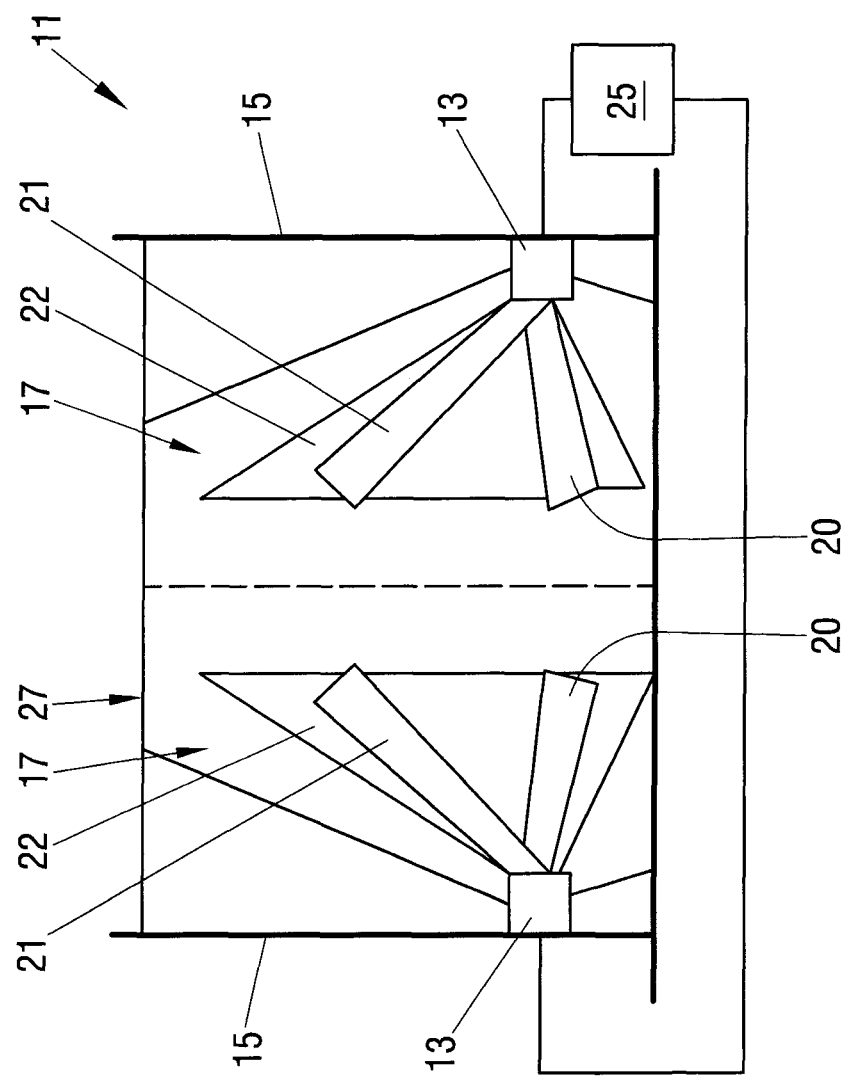
FIG. 1 is a simplified front view of an access protection system in accordance with a first embodiment of the invention.

The access protection system 11 shown in FIG. 1 serves, for example, for the protection of a passage in a production line and comprises two safety sensors 13 that are designed as laser scanners and that are installed opposite one another at respective boundary elements or wall elements 15. The directions of view of the safety sensors 13 face one another. Each of the safety sensors 13 form a safety protected field 17 in operation, as is generally known. A total protected field 27 that largely fills the region between the two wall elements 15 is defined by the safety protected fields 17 of both safety sensors 13.

Each of the two safety sensors 13 form, in addition to the safety protected field 17, three detection protected fields 20, 21, 22 that are provided for an object distinction. The safety protected fields 17 and the detection protected fields 20, 21, 22 can be two-dimensional or three-dimensional. The shown geometry of the detection protected fields 20, 21, 22 having two detection protected fields 20, 21 extending in different directions and one enlarged detection protected field 22 is purely exemplary and can be adapted in a versatile manner in dependence on the application. The safety sensors 13 can each have more than one safety protected field 17 and each can have more than three detection protected fields 20, 21, 22.

The access protection system 11 comprises an electronic control device 25 in the form of a controller that is in signal connection with the safety sensors 13 via suitable interfaces and connection lines. The electronic control device 25 has a switching logic for the logical linking of output signals of the safety protected fields 17 and of the detection protected fields 20, 21, 22. It is possible in this manner to evaluate all the existing protected fields 17, 20, 21, 22 of the access protection system 11 together. The electronic control device 25 is not shown in FIGS. 2-11 for simplification.

Figure 2:
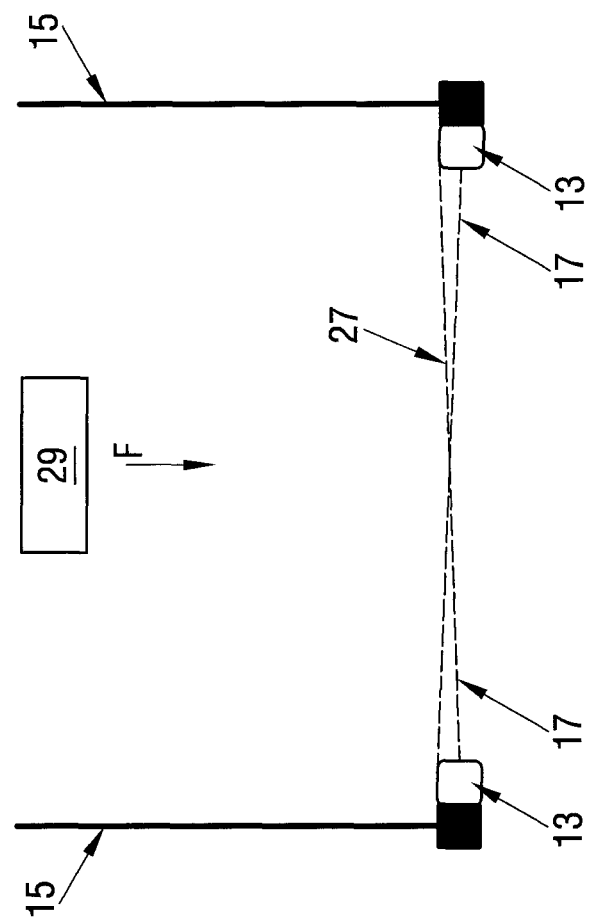
FIG. 2 is a plan view of the access protection system in accordance with FIG. 1.

It can be recognized in FIG. 2 that the safety protected fields 17 of the safety sensors 13 extend in an approximately coplanar manner with one another and span the substantially vertical total protected field 27. Objects 29 transported along a conveying direction F pass through said total protected field during the operation of the associated production line.

On the penetration of an object 29 into the total protected field 27, the electronic control device 25 provides that a safety function is triggered, that is, for example, a warning signal is output and/or a switching off of the plant takes place. If, however, a penetration of the object 29 into two mutually oppositely disposed detection protected fields 20, 21, 22 is determined, the electronic control device 25 initiates a change of the operating state of the access protection system 11, as will be stated in more detail in the following with reference to FIGS. 3-5.

Figure 3:
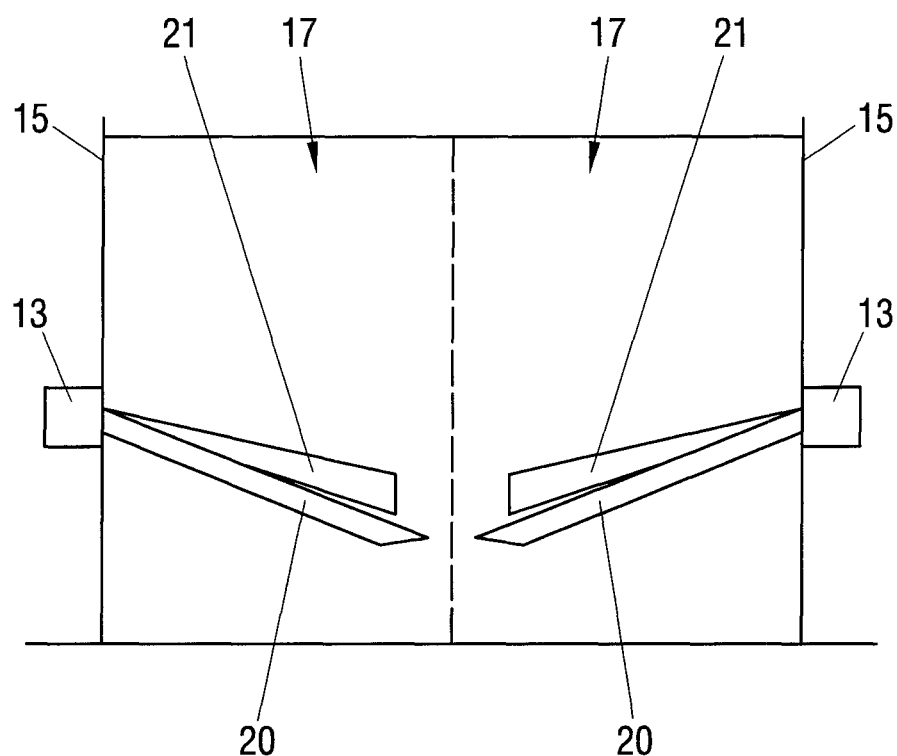
FIG. 3 shows a variant of the access protection system in accordance with FIG. 1 in a first operating state.
Figure 4:
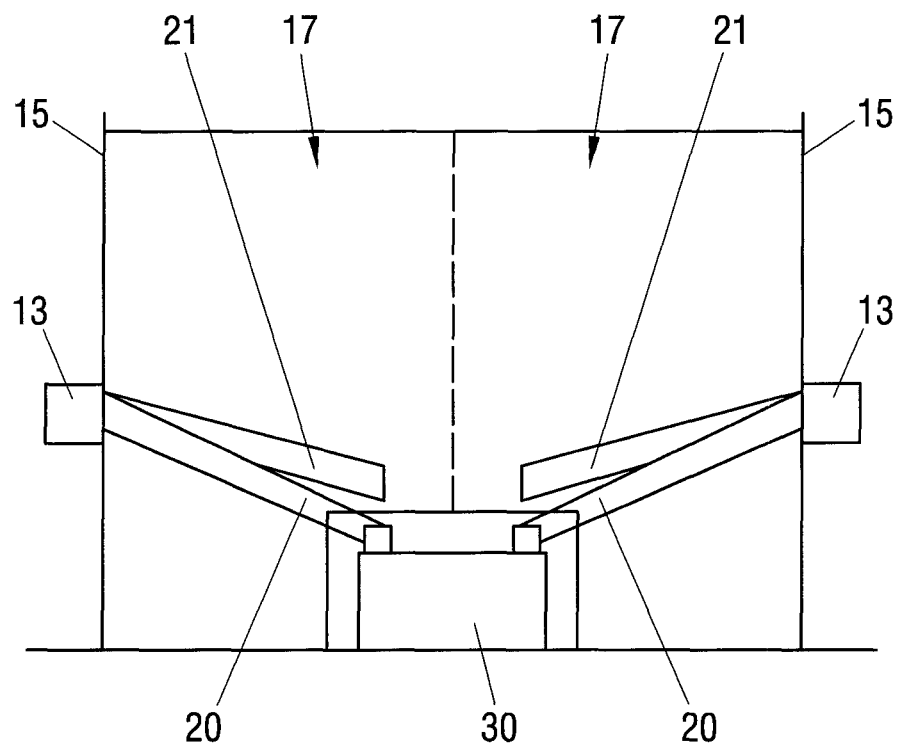
FIG. 4 shows the access protection system in accordance with FIG. 3 in a second operating state.
Figure 5:
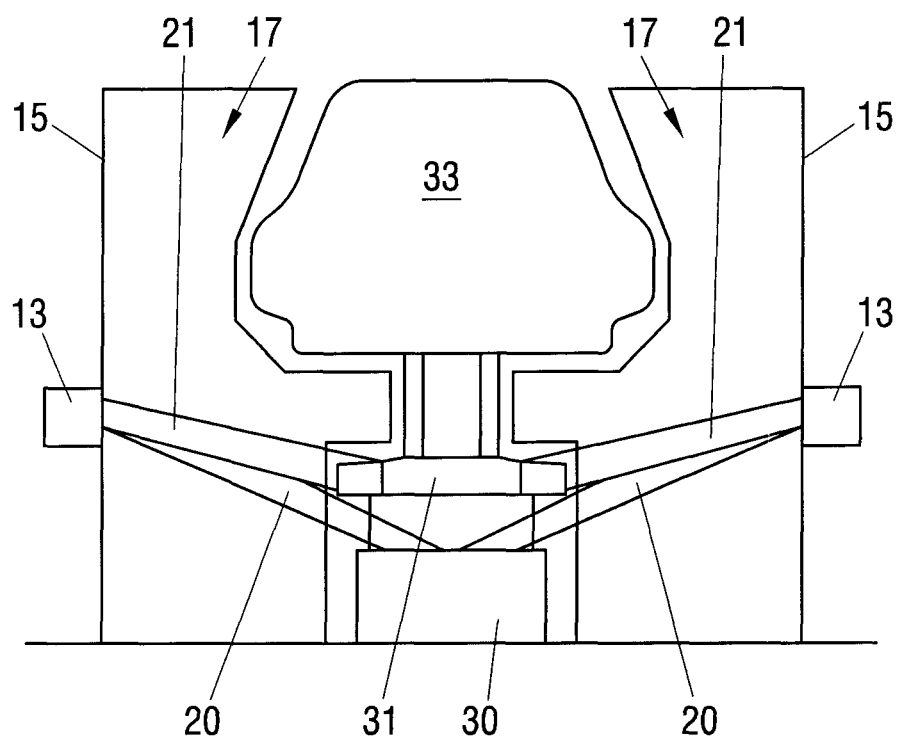
FIG. 5 shows the access protection system in accordance with FIG. 3 in a third operating state.
Figure 6:
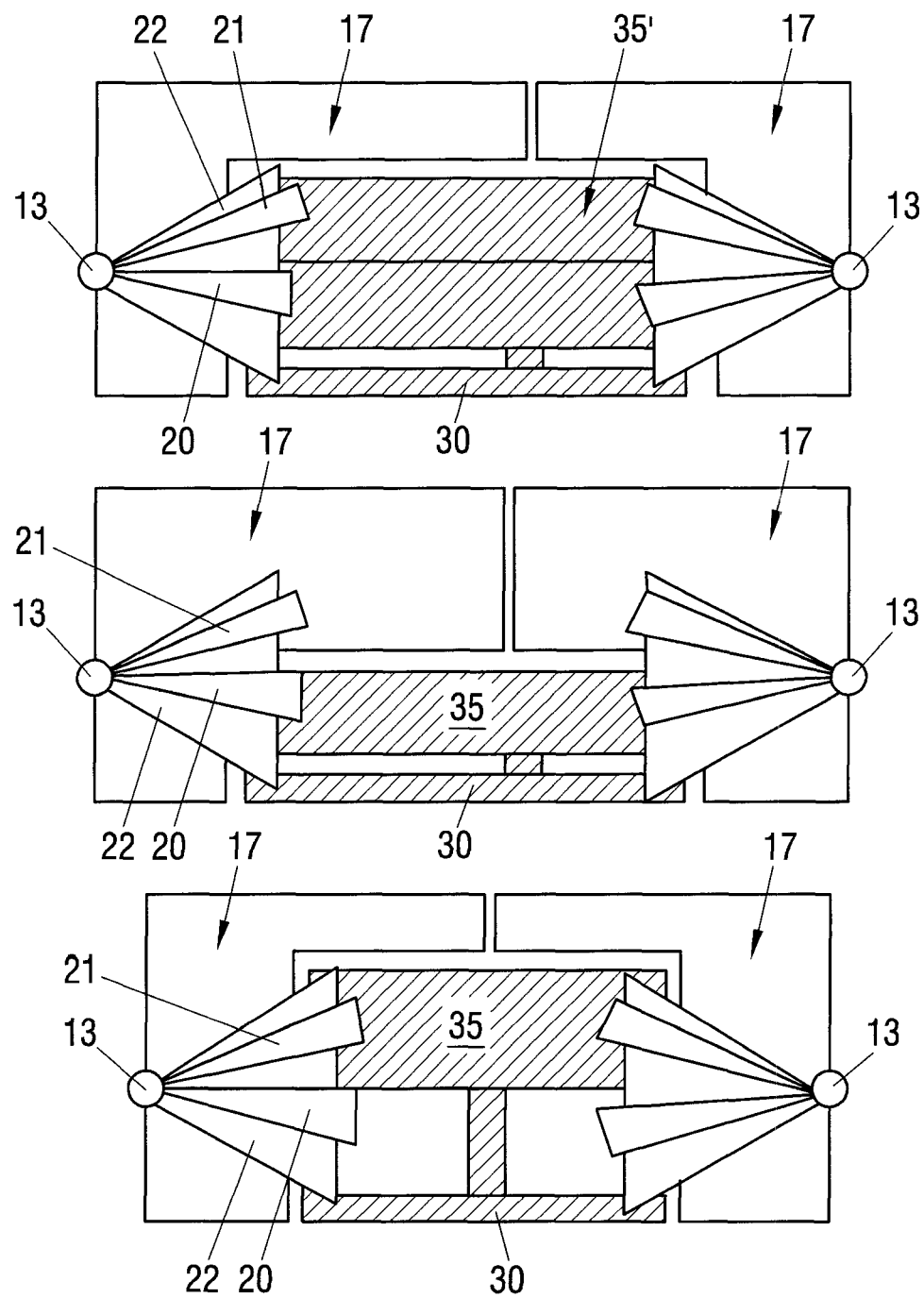
FIG. 6 shows different operating states of a further variant of the access protection system shown in FIG. 1.

In the variant shown in FIGS. 3-5, each safety sensor 13 only forms two detection protected fields 20, 21. If the latter are not infringed as shown in FIG. 3, the safety protected fields 17 substantially fill the total space between the two wall elements 15. If, in contrast, as shown in FIG. 4, a permitted object, here, for example, an automated guided vehicle 30, approaches the safety sensors 13 and infringes the two lower detection protected fields 20 in so doing, the electronic control device 25 provides a size reduction of the safety protected fields 17 so that the automated guided vehicle 30 can pass through the passage without a safety switching off of the plant taking place. The safety protected fields 17 reduced in size, however, generally remain active so that, on the penetration of a person into the safety protected fields 17, a safety switching off still takes place.

An operating situation is shown in FIG. 5 in which a platform 31 of the automated guided vehicle 30 is raised and is loaded with a body 33. The electronic control device 25 recognizes this state at the simultaneous infringement of the upper detection protected fields 21 and provides that the safety protected fields 17, as shown, are adapted to the contour of the automated guided vehicle 30 and of the body 33.

It is understood that a plurality of operating states can be distinguished from one another in the described manner. The adaptation of the safety protected fields 17 for a raised assembly 35 (bottom image), for a lowered assembly 35 (middle image) and for a multi-part assembly 35' (top image) is shown by way of example in FIG. 6.

Figure 7:
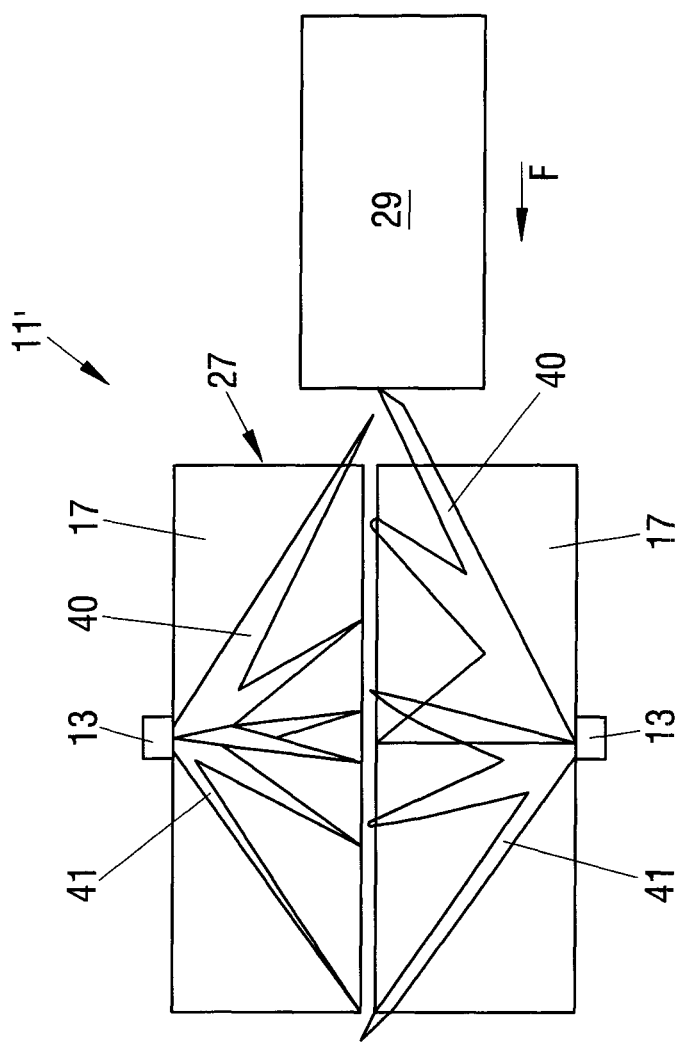
Figure 8:
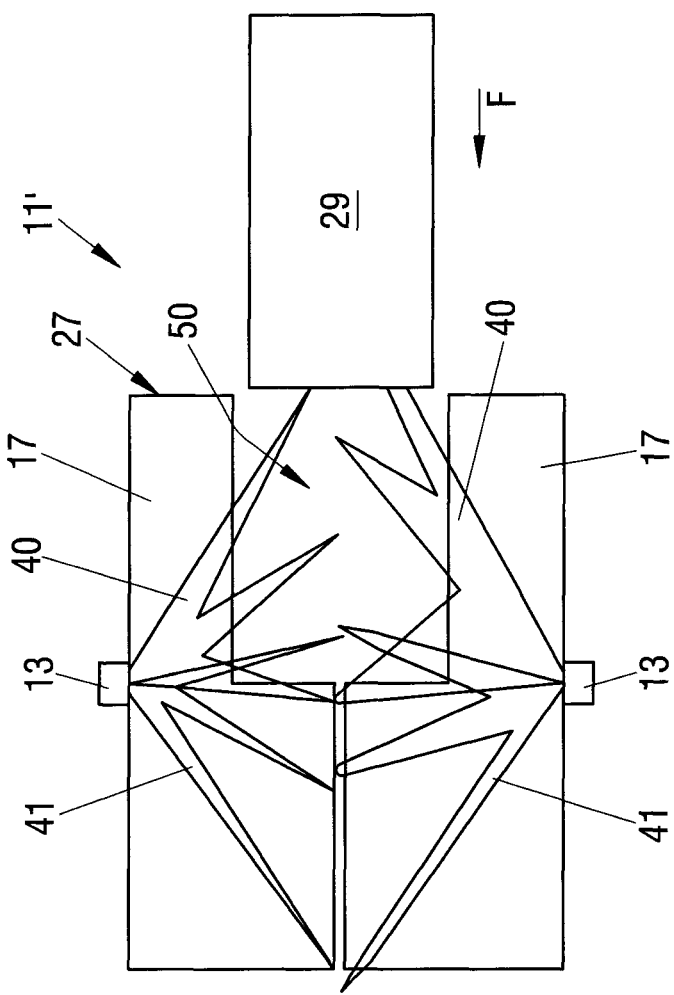
Figure 9:
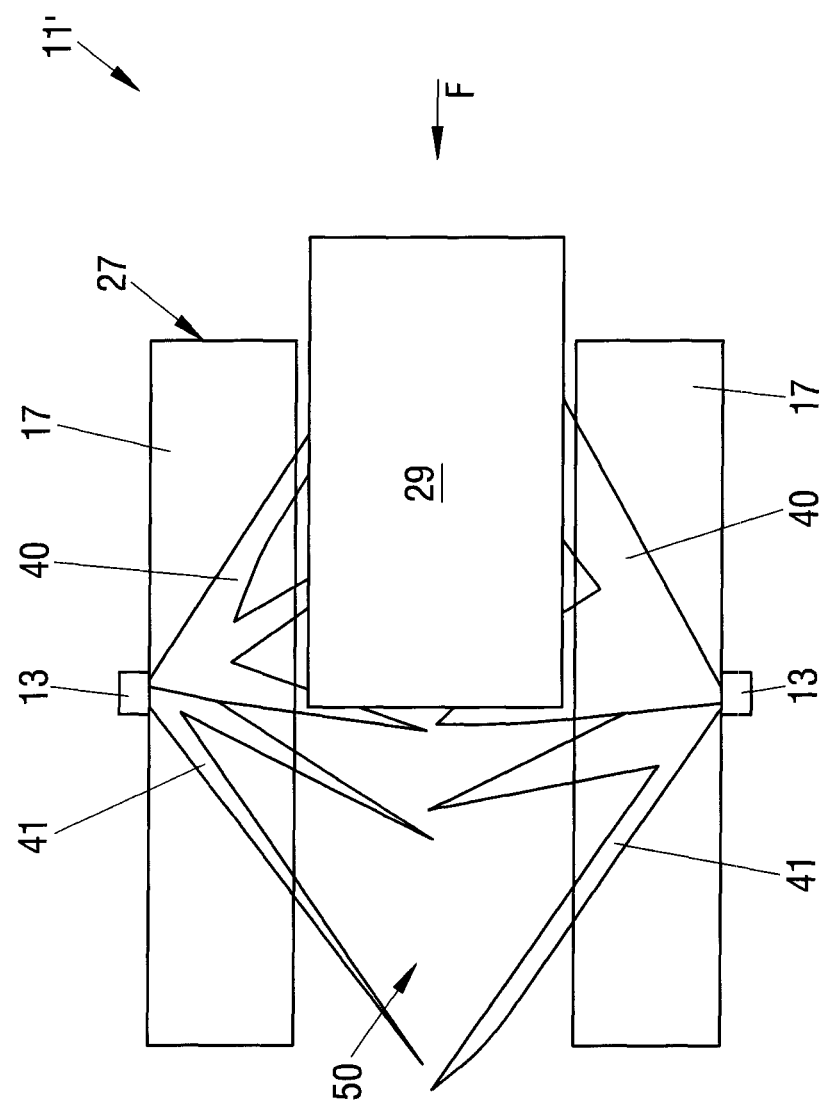

The embodiment of an access protection system 11 shown in FIGS. 7-11 differs from the above-described variants in that the scan planes of the safety sensors 13 extend horizontally. A permitted object 29 that is moved along the conveying direction F through the protected zone still infringes respective detection protected fields 40, 41 that extend beyond the safety protected fields 17 before penetrating into the safety protected fields 17 (FIG. 7). The safety protected fields 17 are then adapted, and indeed such that a cut-out 50 of the total protected field 27 tracks the moved object 29 (FIGS. 8-10). As soon as the object 29 has passed through the protected zone and the detection protected fields 40, 41 are no longer infringed, the safety protected fields 17 are again switched to maximum size (FIG. 11).

The invention enables a safe and reliable recognition of permitted objects 29 with simple means with a simultaneous ensuring of permanent person protection. It is of particular advantage that an access protection system 11, 11' in accordance with the invention can work as an intelligent single sensor that provides its switching information to a higher ranking safe control system.

REFERENCE NUMERAL LIST 11, 11' access protection system
13 safety sensor
15 wall element
17 safety protected field
20, 21, 22 detection protected field
25 electronic control device
27 total protected field
29 object
30 automated guided vehicle
31 platform
33 body
35, 35' assembly
40, 41 detection protected field
50 cut-out
F conveying direction

The invention claimed is:

1. An access protection system
comprising a first safety sensor; a second safety sensor; and an electronic control device that is in signal connection with the first and second safety sensors,
wherein the first and second safety sensors are laser scanners that each form a safety protected field and that each form at least one first detection protected field in operation, with the first and second safety sensors being arranged such that the first detection protected fields do not overlap at least regionally, and with the electronic control device being configured
(i) to trigger a safety function on a penetration of an object into the safety protected field of the first and/or second safety sensors; and
(ii) to change an operating state of the access protection system when a penetration of the object both into the first detected protected field of the first safety sensor and into the first detection protected field of the second safety sensor,
wherein the changing of the operating state of the access protection system comprises an adaptation of the safety protected field of the first and/or second safety sensors.

2. The access protection system in accordance with claim 1,
wherein the electronic control device is configured to subject the safety protected fields and the detection protected fields of the first and second safety sensors to a common evaluation.

3. The access protection system in accordance with claim 1,
wherein the electronic control device is configured to carry out the changing of the operating state in step (ii) in dependence on the current operating state.

4. The access protection system in accordance with claim 1,
wherein the electronic control device comprises a switching logic that is configured to determine whether an object penetrating into the zone to be protected is a permitted object with reference to a logical linking of output signals of all the safety protected fields and of all the detection protected fields.

5. The access protection system in accordance with claim 1,
wherein the electronic control device is configured to adapt the safety protected field of the first and/or second safety sensors to the contour of a predefined permitted object in the changed operating state.

6. The access protection system in accordance with claim 1,
wherein the electronic control device is configured to cause a cut-out of the total protected field formed by the safety protected fields to track an object moved through it by a continuous adaptation of the safety protected field of the first and/or second safety sensors in the changed operating state.

7. The access protection system in accordance with claim 1,
wherein the electronic control device is configured to change the operating state of the access protection system only when the penetration of the object into the first detection protected field of the first safety sensor and into the first detection protected field of the second safety sensor is determined in addition to the penetration of the object into the safety protected field of the first and/or second safety sensors.

8. The access protection system in accordance with claim 1,
wherein the electronic control device is configured to suppress the safety function in the changed operating state.

9. The access protection system in accordance with claim 8,
wherein the electronic control device is configured to suppress the safety function for a predefined time period.

10. The access protection system in accordance with claim 1,
wherein the first and second safety sensors are arranged at oppositely disposed sides of a monitored zone.

11. The access protection system in accordance with claim 1,
wherein the first and second safety sensors define directions of view that at least substantially face one another.

12. The access protection system in accordance with claim 1,
wherein the scan planes of the laser scanners extend at least substantially in a coplanar manner, in parallel with one another, or slightly obliquely with respect to one another.

13. The access protection system in accordance with claim 1,
wherein the safety protected fields of the first and second safety sensors are adjacent to one another or overlap.

14. The access protection system in accordance with claim 1,
wherein the first detection protected field of the first safety sensor and/or the first detection protected field of the second safety sensor each extend in at least one direction beyond the safety protected fields of the first and second safety sensors.

15. The access protection system in accordance with claim 1,
wherein the first and second safety sensors each form at least one second detection protected field in operation that extends in a different direction to the first detection protected field.

* * * * *